US 6,715,069 B1

(12) United States Patent
Lucky

(10) Patent No.: US 6,715,069 B1
(45) Date of Patent: Mar. 30, 2004

(54) METHOD AND APPARATUS FOR IDENTIFYING A VERSION OF AN ELECTRONIC ASSEMBLY USING A UNIQUE EMBEDDED IDENTIFICATION SIGNATURE FOR EACH DIFFERENT VERSION

(75) Inventor: Richard S. Lucky, Louisville, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/545,359

(22) Filed: Apr. 7, 2000

(51) Int. Cl.[7] ............................................. G06F 15/177
(52) U.S. Cl. ............................................. 713/1; 710/8
(58) Field of Search ........................... 713/100, 1, 201; 710/8, 9, 104, 107, 305; 711/200, 202, 211

(56) References Cited

U.S. PATENT DOCUMENTS

| 4,578,773 A | * | 3/1986 | Desai et al. ................ 710/104 |
| 4,649,514 A | * | 3/1987 | Berger ........................ 710/301 |
| 5,457,784 A | | 10/1995 | Wells et al. |
| 5,491,830 A | | 2/1996 | Ferri |
| 5,530,895 A | * | 6/1996 | Enstrom ........................ 710/9 |
| 5,577,213 A | | 11/1996 | Avery et al. |
| 5,581,787 A | * | 12/1996 | Saeki et al. ..................... 710/9 |
| 5,619,724 A | | 4/1997 | Moore |
| 5,801,628 A | | 9/1998 | Maloney |
| 5,816,492 A | * | 10/1998 | Charles et al. ............ 236/78 R |
| 5,909,591 A | | 6/1999 | Brooke |
| 5,909,592 A | | 6/1999 | Shipman |
| 5,926,032 A | | 7/1999 | Gebara et al. |
| 6,115,456 A | * | 9/2000 | Nolde .................... 379/102.01 |
| 6,206,282 B1 | * | 3/2001 | Hayes et al. ................. 235/375 |
| 6,438,625 B1 | * | 8/2002 | Olson ............................ 710/9 |

FOREIGN PATENT DOCUMENTS

EP 525522 A2 * 2/1993 .......... H03K/17/08

OTHER PUBLICATIONS

Chris Saunders—"DTMF Tone Detection"—Dec. 15, 1998—Newsgroups: sci.electronics.design, uk.telecom.*

* cited by examiner

*Primary Examiner*—Thomas Lee
*Assistant Examiner*—Thuan Du
(74) *Attorney, Agent, or Firm*—Crawford Mannu PLLC

(57) ABSTRACT

A method and apparatus for identifying a version of an electronic assembly using a unique embedded identification signature for each different version is disclosed. A unique instruction code is loaded on each type or version of a electronic assembly. The unique embedded identification signature allows common instruction code over a family (different types) and versions (revisions) of an electronic assembly. Allowing common code is must less costly to maintain and takes very little board space.

11 Claims, 8 Drawing Sheets

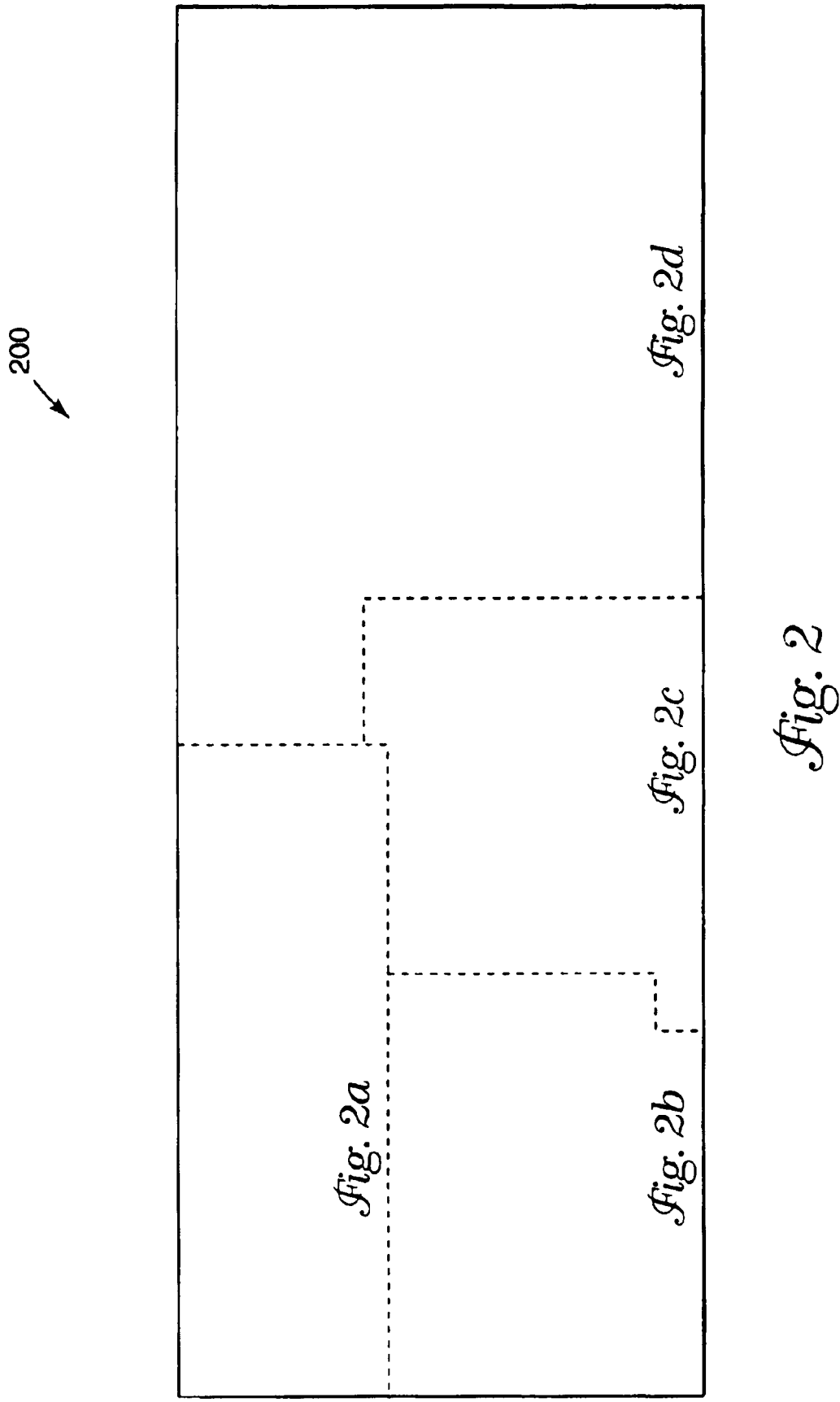

METHOD AND APPARATUS FOR IDENTIFYING A VERSION OF AN ELECTRONIC ASSEMBLY USING A UNIQUE EMBEDDED IDENTIFICATION SIGNATURE FOR EACH DIFFERENT VERSION

BACKGROUND OF THE INVENTION

1. Field of the Invention

This invention relates in general to the determination of system configuration in a microprocessor-based system, and more particularly to a method and apparatus for identifying a version of an electronic assembly using a unique embedded identification signature for each different version.

2. Description of Related Art

The microprocessor industry has experienced tremendous growth over the last twenty years. From the days of its infancy, the microprocessor has now evolved into a powerful business and personal tool found on virtually every office desk and in virtually every home. Moreover, devices with the computing power that would be the envy of large computing systems decades ago are now found in devices ranging from personal digital assistants and gaming consoles to printers and network routers.

The number of areas where microprocessors are being utilized is growing dramatically. The areas are varied, and as a result, have different requirements for the various subsystems forming a complete computer system. For example, personal computers used primarily for word processing have relatively modest requirements for installed memory and processor subsystems, have very high performance requirements for the mass storage subsystem and have varying requirements for the display subsystem, depending on the exact application, such as high resolution desktop publishing or simpler letter production, being performed. A data storage and retrieval oriented system needs larger amounts of memory, a faster processor, may have lesser mass storage requirements and generally has minimal display requirements.

One early idea to enhance microprocessor systems was the addition of hardware enhancing boards. These boards were generally plugged into a system bus to provide added functionality, such as telecommunications, disk storage, and improved video. Higher chip complexity beget more complex printed circuit boards. Because of production volume requirements and the reduced costs as volumes increase, it is desirable that as many common features as possible are combined into high volume boards. This has happened in the personal computer, printer, copier and other office equipment area by developing basic units of varying processor performance levels, with the other subsystems incorporated by the inclusion of interchangeable modules.

Modules of the desired performance level are incorporated into the basic unit to tailor the basic processor unit to the desired complete system. Because of the inherent flexibility of this design approach, it becomes difficult to develop a single piece of software to control the system. Moreover, the software cannot depend on a given configuration being present and so arrangements must be made to allow the software to understand the specific configuration. Additionally, the provisions must be made so the various modules forming the subsystems do not interfere with each other.

In addition, a new version (production level) of an electronic board, such as a mother board, embedded controller, etc., often needs a unique computer code level because a new feature or different hardware implementation is created. However, all the board versions must be supported, but only one level of the code is desired to reduce the maintenance cost. Being able to sense the version of the board enables the code to automatically deal with the hardware differences specific to the version of the board. Also, problems with a particular version of the board can be uniquely treated by the instruction code based on that version ID.

It can be seen then that there is a need for a method and apparatus that provides version identification for an electronic board that is very cost effective and simple.

SUMMARY OF THE INVENTION

To overcome the limitations in the prior art described above, and to overcome other limitations that will become apparent upon reading and understanding the present specification, the present invention discloses a method and apparatus for identifying a version of an electronic assembly using a unique embedded identification signature for each different version.

The present invention solves the above-described problems by providing a unique instruction code loaded on each type or version of a board. The board ID solution allows common instruction code over a family (different types) and versions (revisions) of a board. Allowing common code is much less cost to maintain and takes very little board space.

A method in accordance with the principles of the present invention includes selecting a predetermined address reserved for a unique embedded identification signature representing a version for the electronic assembly, returning a binary coded signal provided by passive resistors configured to provide an indication of the version of the electronic assembly and configuring a processor according to the version for the electronic assembly indicated by the binary encoded signal.

Other embodiments of a method in accordance with the principles of the invention may include alternative or optional additional aspects. One such aspect of the present invention is that returning of the binary code indicating a version includes returning a first set of bits indicating a machine type for the electronic assembly and returning a second set of bits indicating a revision indication for the electronic assembly.

Another embodiment of the present invention includes an apparatus for identifying a version of an electronic assembly. The apparatus includes a data bus having a reserved bus address and a circuit arrangement, coupled to the data bus, for providing a binary coded signal indicating a of the version of the electronic assembly for configuring a processor according to the version for the electronic assembly indicated by the binary coded signal.

Another aspect of the present invention is that the circuit arrangement comprises a plurality of passive resistors selected and configured to generate the binary coded signal indicating the version of the electronic assembly.

Another aspect of the present invention is that the data bus comprises a bus having no other device thereon that can be selected to drive the bus.

Another aspect of the present invention is that the version indicated by the binary coded signal comprises a first set of bits indicating a machine type for the electronic assembly and a second set of bits indicating a revision indication for the electronic assembly.

Another embodiment of the present invention includes a system. The system includes a processor and at least one electronic assembly, coupled to the processor via a data bus, the at least one electronic assembly providing predetermined functionality to the system under control of the processor, wherein the at least one electronic assembly further includes a data bus having a reserved bus address and a circuit arrangement, coupled to the data bus, for providing a binary coded signal indicating a version of the at least one electronic assembly for configuring a processor according to the version for the at least one electronic assembly indicated by the binary coded signal.

Another aspect of the present invention is that the circuit arrangement comprises a plurality of passive resistors selected and configured to generate the binary coded signal indicating the version of the at least one electronic assembly.

Another aspect of the present invention is that the data bus comprises a bus having no other device thereon that can be selected to drive the bus.

Another aspect of the present invention is that the version indicated by the binary coded signal comprises a first set of bits indicating a machine type for the at least one electronic assembly and a second set of bits indicating a revision indication for the at least one electronic assembly.

Another aspect of the present invention is that the at least one electronic assembly comprises a plurality of electronic assemblies, each of the plurality of electronic assemblies providing a version indicated by a binary coded signal from each of the plurality of electronic assemblies.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for identifying a version of an electronic assembly using a unique embedded identification signature for each different version. A unique instruction code is loaded on each type or version of a board. The unique embedded identification signature solution allows common instruction code over a family (different types) and versions (revisions) of an electronic assembly. Allowing common code is must less costly to maintain and takes very little board space.

Figure 1:
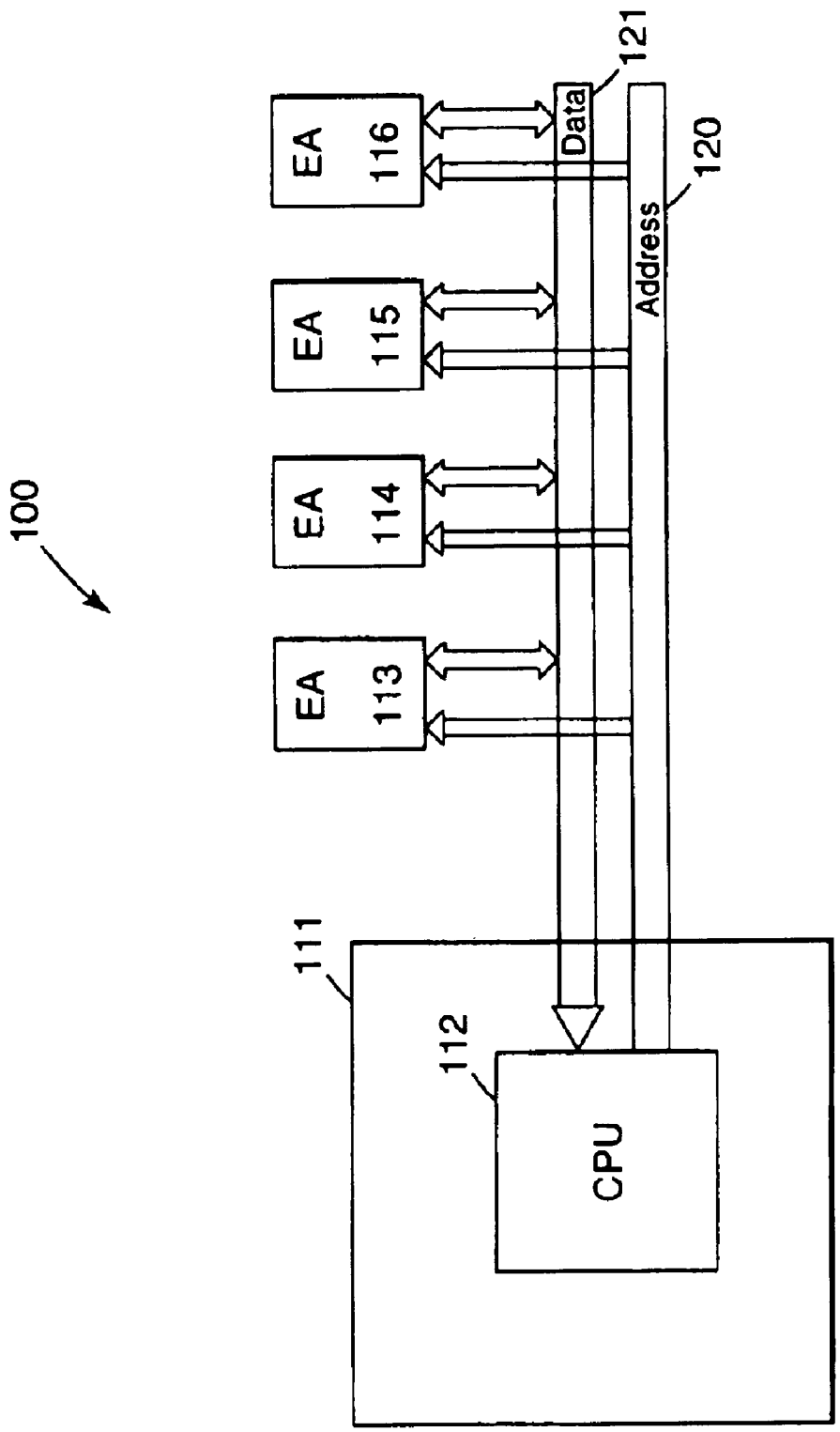
FIG. 1 illustrates a system block diagram of the present invention.
Figure 2A:
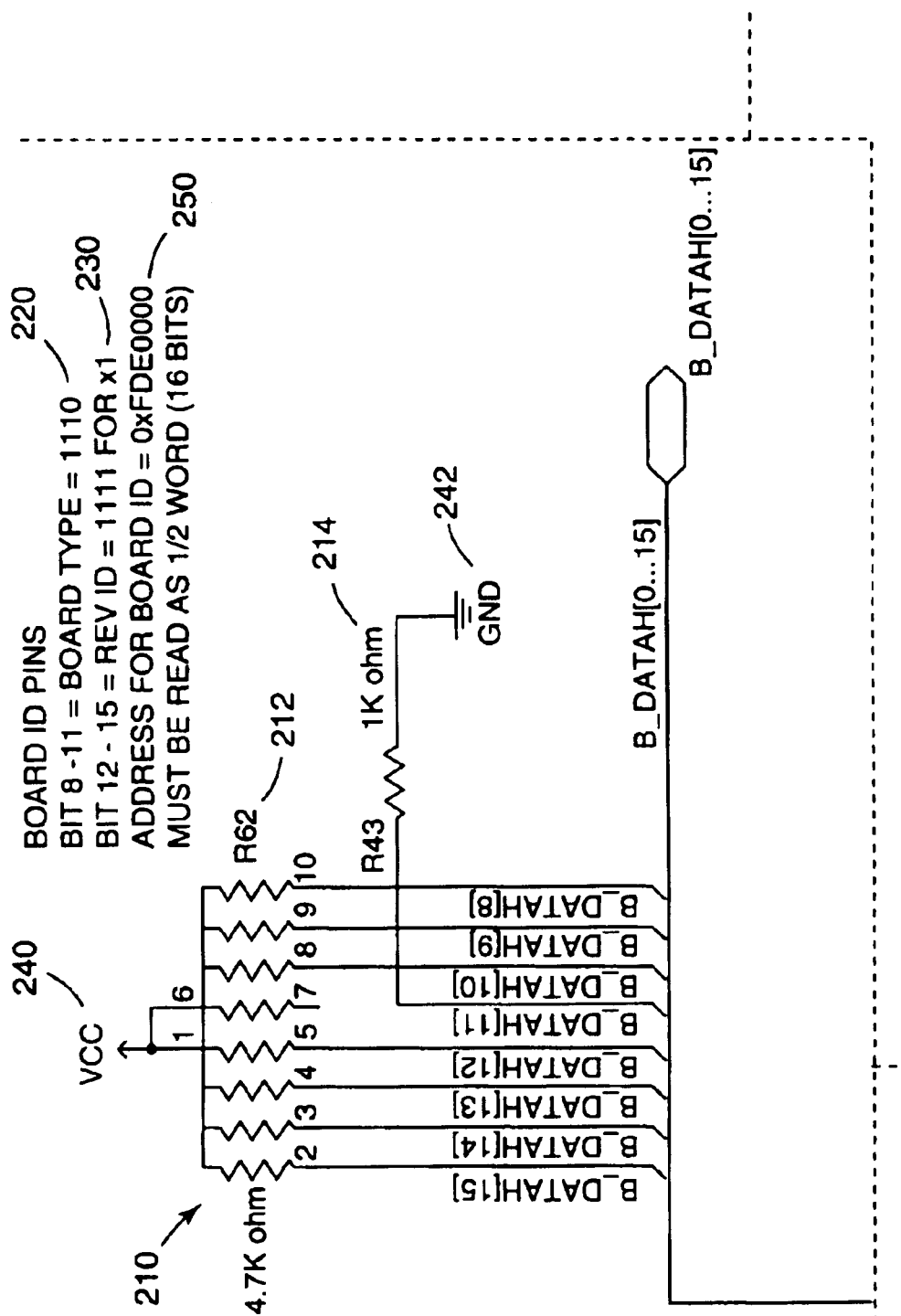
FIG. 2 illustrates the implementation of an electronic assembly having a unique embedded identification signature represent the version for the electronic assembly according to the present invention.
Figure 2B:
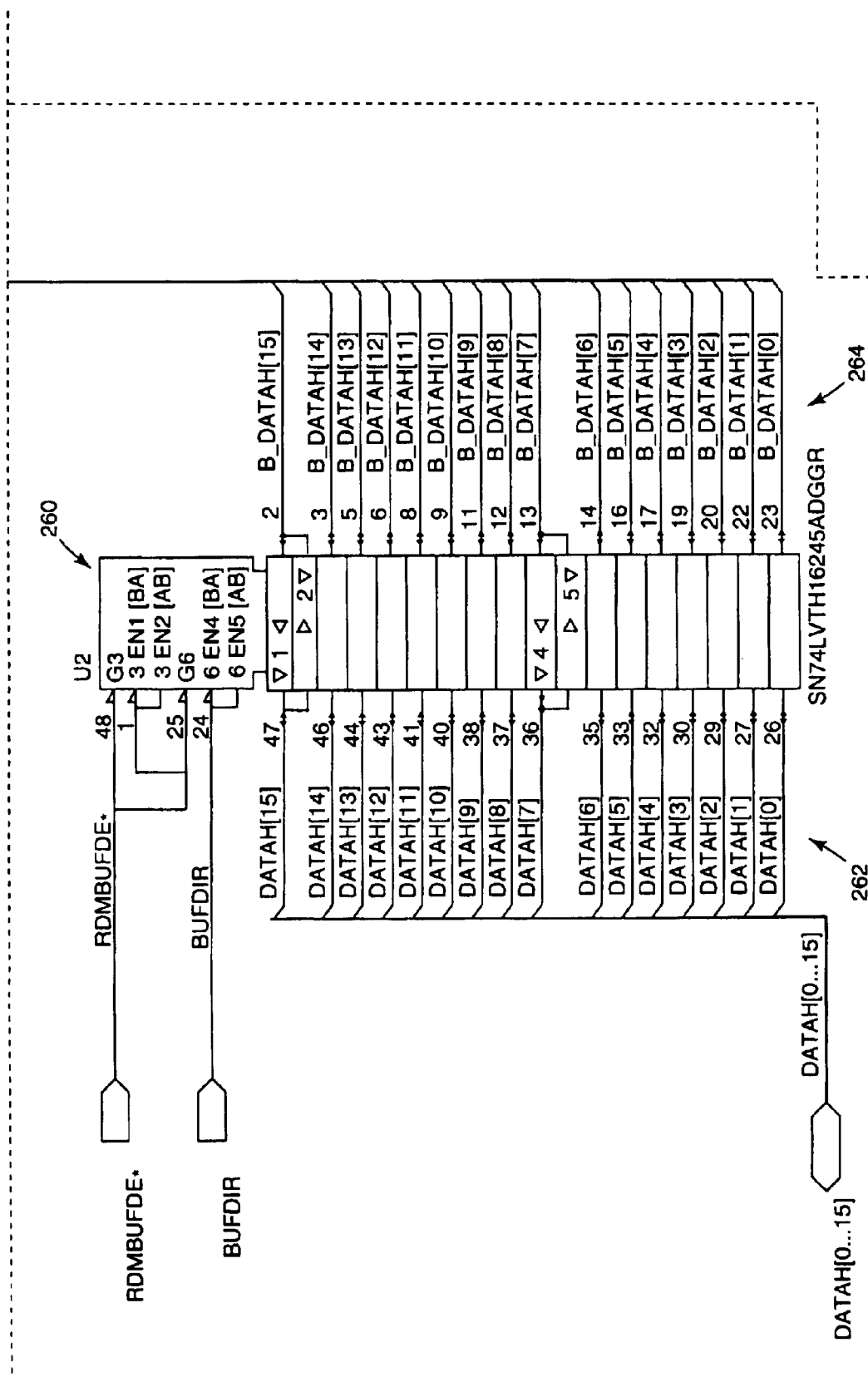
Figure 2C:
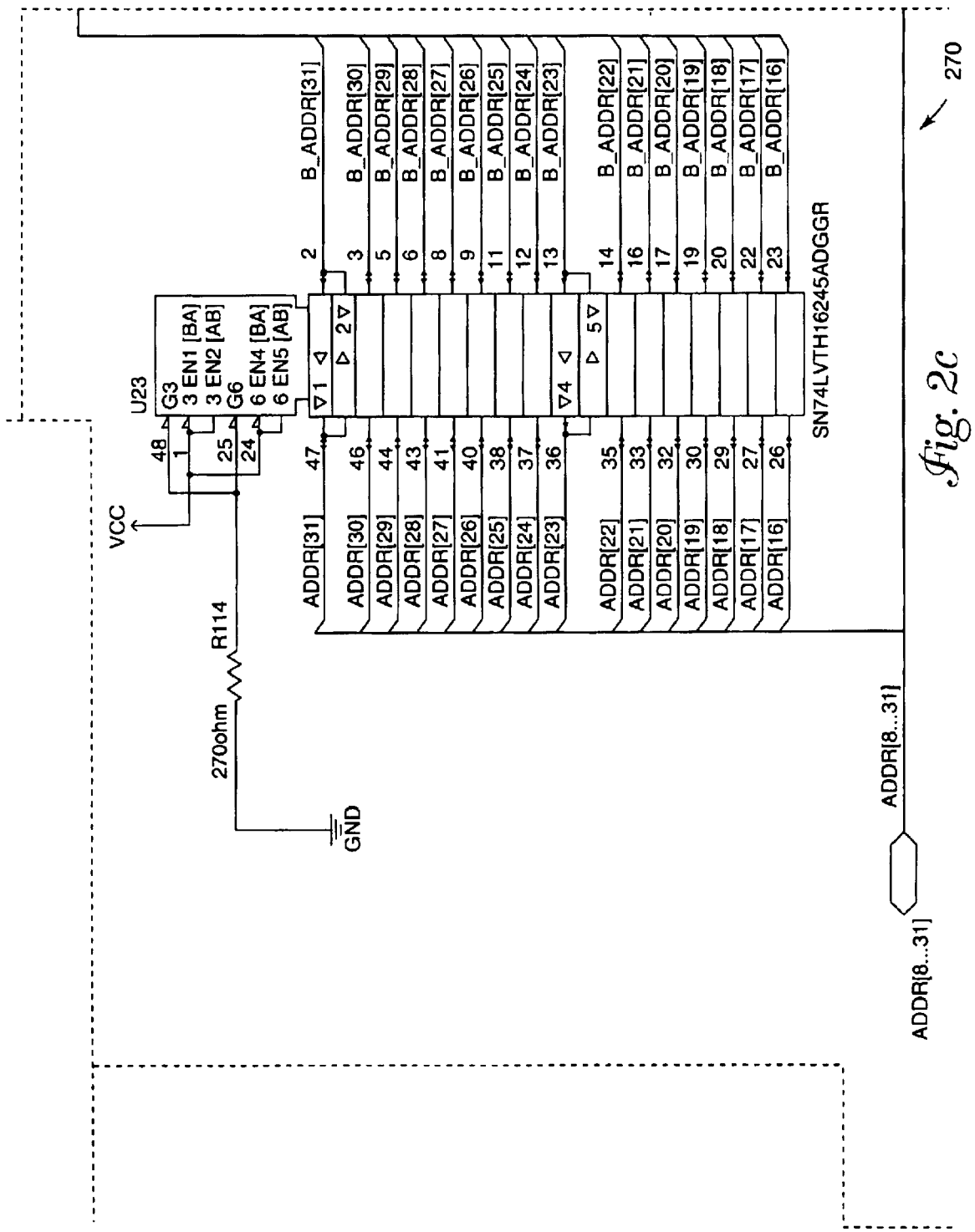
Figure 2D:
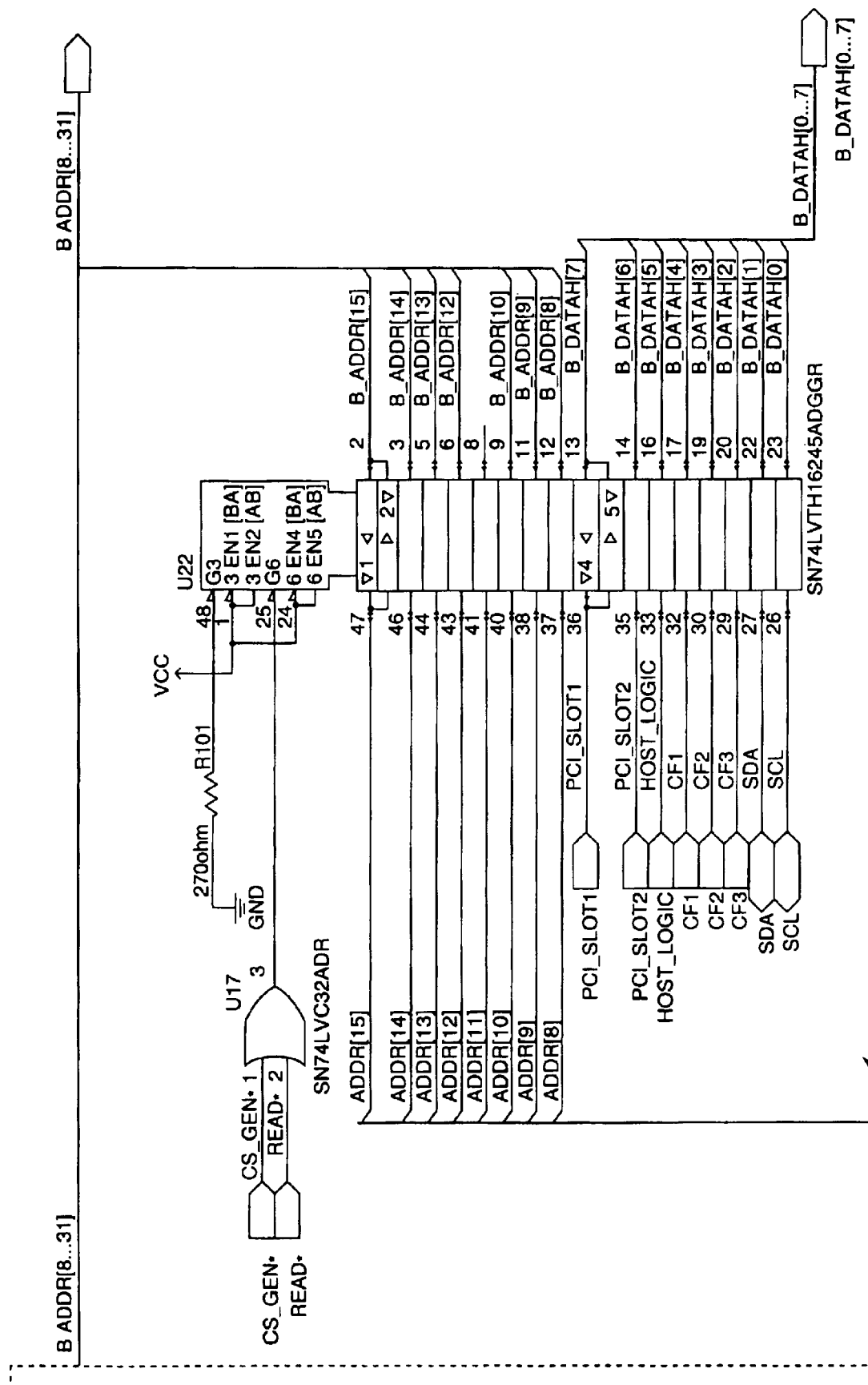

FIG. 1 illustrates a system block diagram 100 of the present invention. System 100 includes host hardware 111, interconnections and various electronic board assemblies 113–116. The host hardware of the present invention includes a CPU 112; however, a variety of other hardware controllers can provide equivalent functions in communicating and controlling electronic board assemblies 113–116. The electronic assemblies 113–116 provide predetermined functionality to the system 100 under control of the processor 112. Each of the electronic board assemblies 113–116 are coupled to an address bus 120 and data bus 121. Address bus 120 and data bus 121 may be of a variety of prior art buses for accessing memories by providing an address on address bus 120 and reading or writing data from and to electronic board assemblies 113–116 on data bus 121. Address bus 120 and data bus 121 are coupled to the CPU 112. Although four electronic board assemblies 113–116 are shown in FIG. 1, any number can be utilized without departing from the spirit and scope of the present invention.

In operation, CPU 112 will select a predetermined address on one of the electronic board assemblies 113–116 to detect a unique embedded identification signature indicating the version of that electronic board assembly.

FIG. 2 illustrates the implementation of an electronic assembly 200 having a unique embedded identification signature represent the version for the electronic assembly according to the present invention. In FIG. 2, passive resistors 210 are embedded on a data bus. The passive resistors 210 set logic levels for identifying the version of the electronic assembly when no other device on the bus is selected to drive the data bus. Multiple logic levels are used to represent the board type 220 and version 230 encoded as a binary number.

The type 220 is defined as a machine type and the version is the revision of the board. The type 220 is useful when many different machine types use similar hardware and software, but must be distinguished to enable features and program component speed. The version 230 is useful when a new hardware implementation provides the same as function, but requires unique treatment by the computer instruction code.

The resistors 210 on each data line of a data bus (or on a subset of the bus) hold the type/version value on the bus by being connected (tied) to positive supply 240 and ground potential 242 as needed to create the encoded value when no other device is selected to drive the bus. This passive method is simple, cheap and non-invasive to the system on all but the fastest busses. An address that selects the bus must be defined and not used for any device. The value of the resistors 210 is determined by the logic technology and loading of each signal by other devices.

In FIG. 2, resistors R62 212 and R63 214 form the board identification pins. The resistors are selected so that bits 8–11 (1110) indicate the board type 220. Bits 12–15 (1111) are used to indicate the revision identification 230 for the electronic assembly. In the example represented by FIG. 2, the predetermined address, which is selected so that it is not used for any other device, is shown as being 0xFDE0000 250. Note that the transceiver 260 provides a fast bus DATAH(0–15) 262. The unique embedded identification signature is then placed on the slower buffered data lines B_DATAH(0–15) 264. However, those skilled in the art will recognize that the present invention is not meant to be limited to the particular implementation illustrated in FIG. 2. For example, the passive resistors 210 providing the unique embedded identification signature could be implemented on the fast bus DATAH(0–15) 262. Additional devices 270 are also implemented on the electronic assembly 200.

Figure 3:
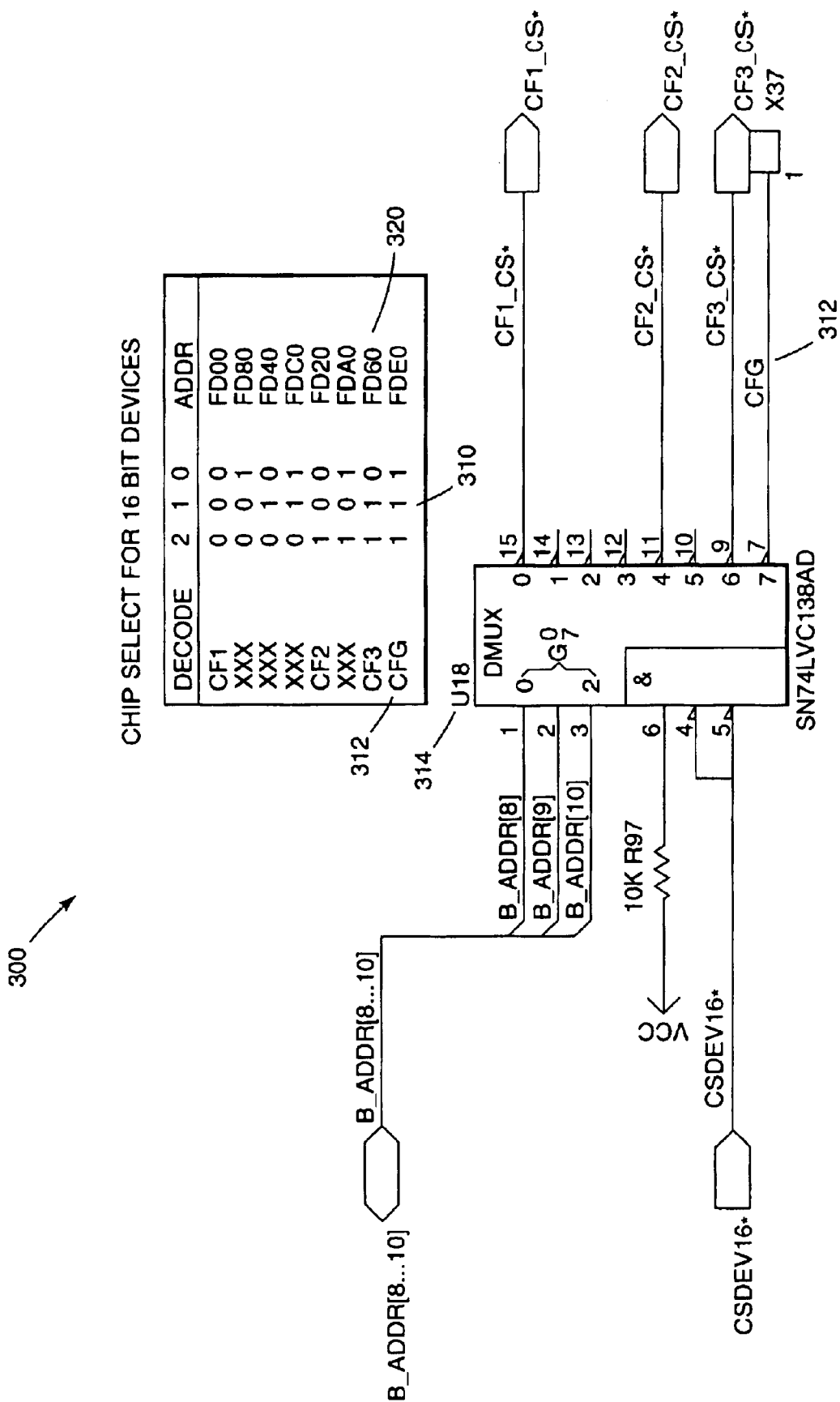
FIG. 3 illustrates a 16 bit chip select address decode 300 for reading the logic values from the unique embedded identification signature provided by the resistors according to the present invention.

FIG. 3 illustrates a 16 bit chip select address decode 300 for reading the logic values from the unique embedded identification signature provided by the resistors according to the present invention. Those skilled in the art will recognize that the present invention is not meant to be limited to the particular chip select address decode illustrated in FIG. 3. For example, a chip select for 8-bit device could also be implemented in accordance with the teachings of the present invention. In FIG. 3, a separate decode 310 for CFG 312 on the demultiplexor 314 selects addresses starting with 0xFDE0 320. The CFG signal 312 is active for this decode, but it is not attached to any device. Rather, address 0xFDE0 320 is reserved for electronic assembly configuration to be read from the unique embedded identification signature provided by the resistors as shown in FIG. 2.

Figure 4:
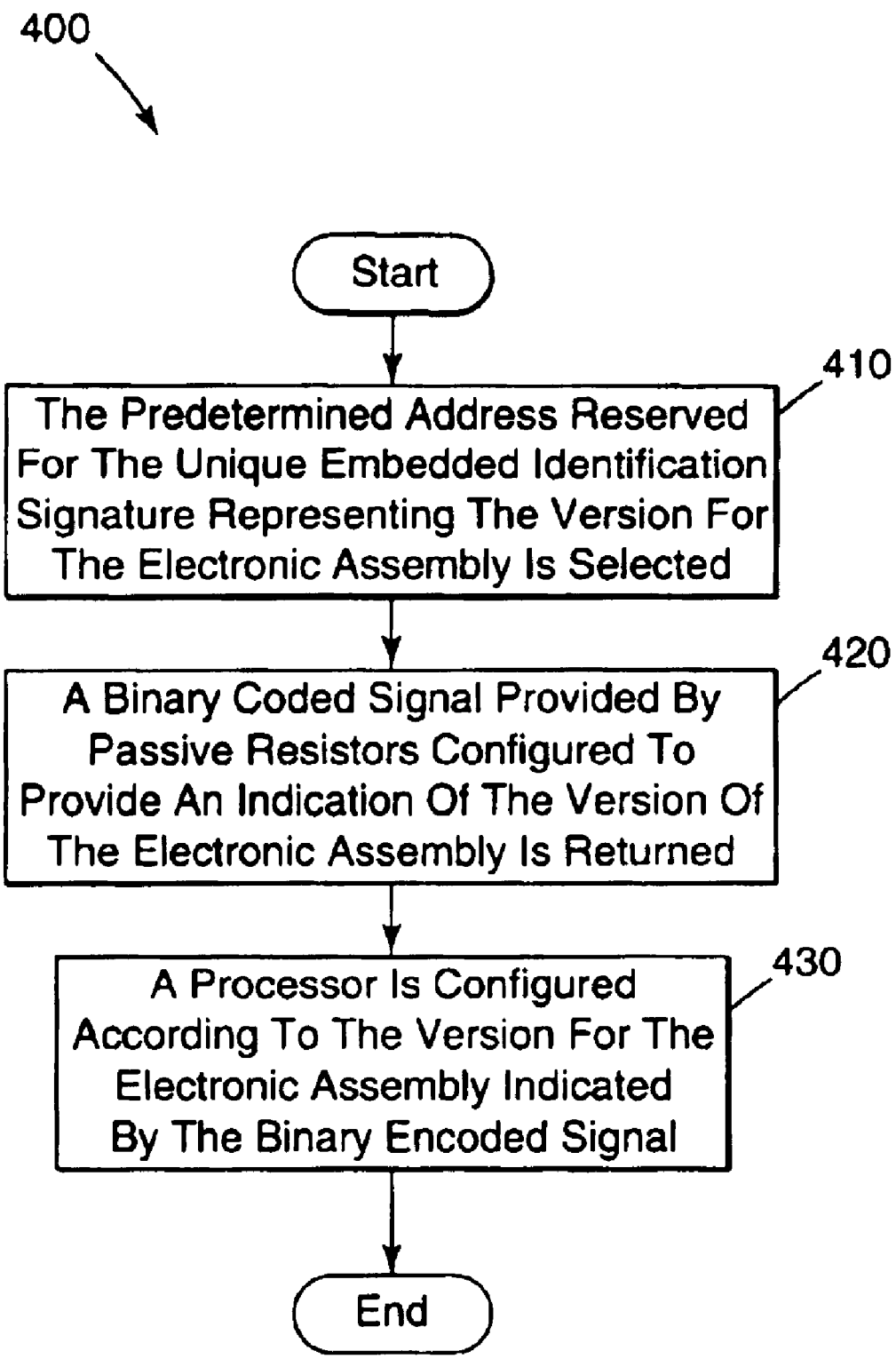
FIG. 4 illustrates a flow chart of the present invention.

FIG. 4 illustrates a flow chart 400 of the present invention. In FIG. 4, the predetermined address reserved for the unique embedded identification signature representing the version for the electronic assembly is selected 410. A binary coded signal provided by passive resistors configured to provide an indication of the version of the electronic assembly is returned 420. A processor is configured according to the version for the electronic assembly indicated by the binary encoded signal 430.

In summary, the present invention provides a method and apparatus for identifying a version of an electronic assembly using a unique embedded identification signature for each different version. A unique instruction code is loaded on each type or version of a electronic assembly. The unique embedded identification signature allows common instruction code over a family (different types) and versions (revisions) of an electron assembly. Allowing common code is must less costly to maintain and takes very little board space.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for identifying a version of an electronic assembly comprising:
   selecting a predetermined address reserved for a unique embedded identification signature representing a version for the electronic assembly;
   returning a binary coded signal provided by passive resistors configured to provide an indication of the version of the electronic assembly; and
   configuring a processor according to the version for the electronic assembly indicated by the binary encoded signal.

2. The method of claim 1 wherein the returning of the binary code indicating a version comprises:
   returning a first set of bits indicating a machine type for the electronic assembly; and
   returning a second set of bits indicating a revision indication for the electronic assembly.

3. An apparatus for identifying a version of an electronic assembly, comprising:
   a data bus having a reserved bus address; and
   a circuit arrangement, coupled to the data bus, for providing a binary coded signal indicating the version of the electronic assembly for configuring a processor according to the version for the electronic assembly indicated by the binary coded signal.

4. The apparatus of claim 3 wherein the circuit arrangement comprises a plurality of passive resistors selected and configured to generate the binary coded signal indicating the version of the electronic assembly.

5. The apparatus of claim 3 wherein the data bus comprises a bus having no other device thereon that can be selected to drive the bus.

6. The apparatus of claim 3 wherein the version indicated by the binary coded signal comprises a first set of bits indicating a machine type for the electronic assembly and a second set of bits indicating a revision indication for the electronic assembly.

7. A system, comprising:
   a processor; and
   at least one electronic assembly, coupled to the processor via a data bus, the at least one electronic assembly providing predetermined functionality to the system under control of the processor, wherein the at least one electronic assembly further includes:
      a data bus having a reserved bus address; and
      a circuit arrangement, coupled to the data bus, for providing a binary coded signal indicating a version of the at least one electronic assembly for configuring a processor according to the version for the at least one electronic assembly indicated by the binary coded signal.

8. The system of claim 7 wherein the circuit arrangement comprises a plurality of passive resistors selected and configured to generate the binary coded signal indicating the version of the at least one electronic assembly.

9. The system of claim 7 wherein the data bus comprises a bus having no other device thereon that can be selected to drive the bus.

10. The system of claim 7 wherein the version indicated by the binary coded signal comprises a first set of bits indicating a machine type for the at least one electronic assembly and a second set of bits indicating a revision indication for the at least one electronic assembly.

11. The system of claim 7 wherein the at least one electronic assembly comprises a plurality of electronic assemblies, each of the plurality of electronic assemblies providing a version indicated by a binary coded signal from each of the plurality of electronic assemblies.

* * * * *